(12) United States Patent
Ciguere

(10) Patent No.: US 6,568,347 B2
(45) Date of Patent: May 27, 2003

(54) PET TRAVEL CONTAINER KIT

(75) Inventor: Angela Ciguere, Newport, RI (US)

(73) Assignee: Travel Meals Inc., Palm Beach, FL (US)

(*) Notice: Subject to any disclaimer, the term of this patent is extended or adjusted under 35 U.S.C. 154(b) by 0 days.

(21) Appl. No.: 09/875,817

(22) Filed: Jun. 6, 2001

(65) Prior Publication Data
US 2002/0185390 A1 Dec. 12, 2002

(51) Int. Cl.⁷ .................... A01K 5/01; B65D 69/00
(52) U.S. Cl. .................. 119/61; 119/51.5; 206/541; 426/115
(58) Field of Search .................. 206/219, 541, 206/542; 119/51.12, 51.5, 61, 62; 426/112–115, 120, 124, 87, 383; 270/4.21

(56) References Cited

U.S. PATENT DOCUMENTS

| | | | | |
|---|---|---|---|---|
| 1,243,239 A | * | 10/1917 | Albrechtsen | 220/4.21 |
| 2,657,820 A | * | 11/1953 | Quigley | 220/4.21 |
| 4,249,483 A | * | 2/1981 | Sobky | 119/51.12 |
| 5,117,781 A | * | 6/1992 | Roach | 119/168 |
| 5,167,973 A | * | 12/1992 | Snyder | 426/115 |
| 5,209,184 A | * | 5/1993 | Sharkan et al. | 119/61 |
| 5,346,710 A | * | 9/1994 | Geitner | 426/115 |
| 5,458,087 A | * | 10/1995 | Prior et al. | 119/51.5 |
| 5,752,464 A | * | 5/1998 | King et al. | 119/51.5 |
| 5,823,136 A | * | 10/1998 | Zarski | 119/61 |
| 5,947,056 A | * | 9/1999 | Zarski | 119/61 |

\* cited by examiner

Primary Examiner—Bryon P. Gehman

(57) ABSTRACT

The travel container of the present invention is a disposable package in the form of a kit for the storage of a predefined quantity of drinking water and a predefined quantity of pet food in independent pouches to form a predefined meal for a pet dog or pet cat when traveling on a short excursion. The travel container includes, in combination, an open receptacle having a relatively deep compartment with a flat bottom and a large opening for storing a supply of pet food in a closed pouch, a separate sealed pouch in which a source of water is stored and a cover lid for closing the open receptacle. The supply of pet food and the source of water are present in proportional amounts to form a predefined convenience pet meal upon opening the pouch of pet food and the water pouch and combining the water with the pet food.

8 Claims, 4 Drawing Sheets

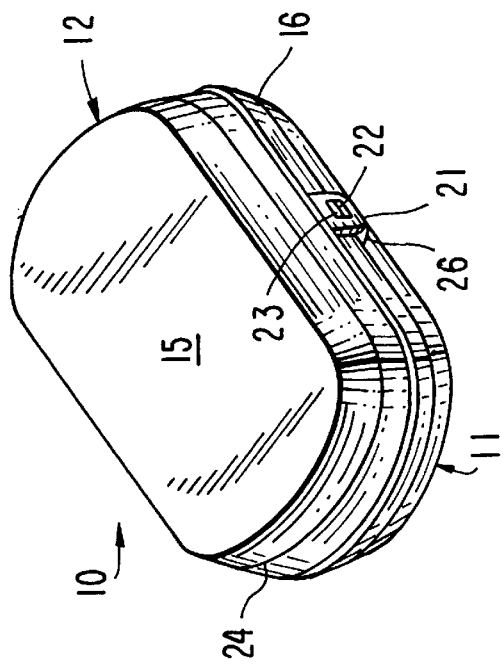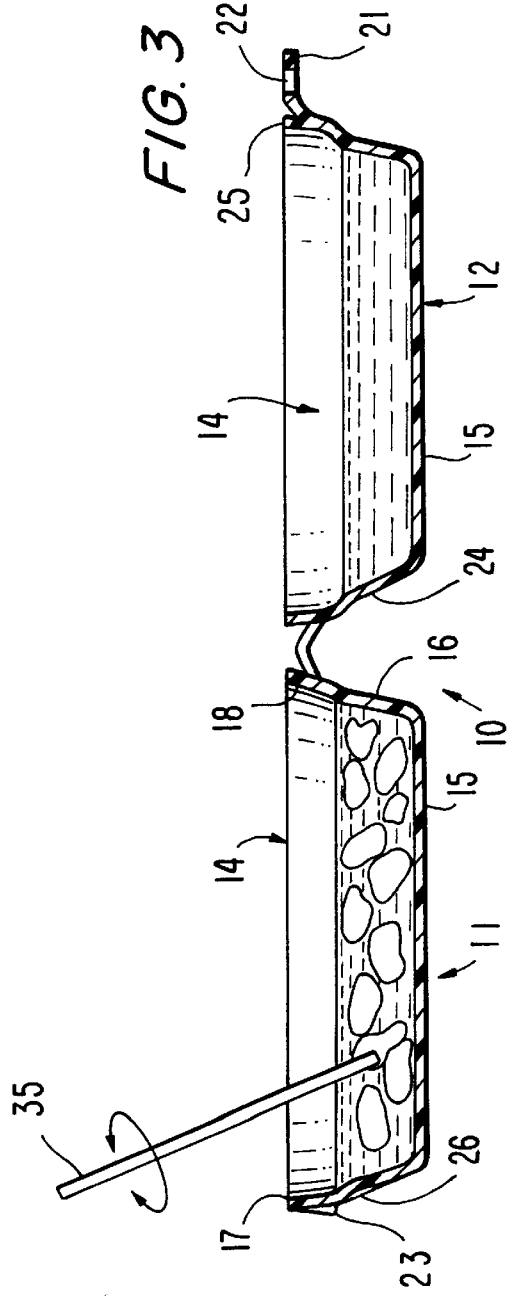

PET TRAVEL CONTAINER KIT

FIELD OF THE INVENTION

The present invention relates to a mobile disposable travel container kit for a pet canine or feline which can be used as a drinking bowl from which the pet can drink water and for separately storing a portioned quantity of pet food with a fixed supply of water for ready mixing in proper proportion to one another in the disposable container so as to provide nourishment for the pet without fuss or inconvenience when in transit.

BACKGROUND OF THE INVENTION

When a pet is taken along on a trip the pet will at some point need to be provided with water as well as pet food particularly if the trip extends over a long time interval. Ordinarily the owner of the pet will either purchase pet food such as dry pet food from an available grocery food outlet or bring it along on the trip. The purchase of canine pet food in small quantities for a limited excursion such as a one day trip or for an intraday trip is generally not available and if the pet owner is not traveling in a car additional items will also need to be separately purchased such as a mixing bowl, a source of water and an appropriate mixing utensil. For a pet feline a liter box is also essential. The separate purchase of all of these items is time consuming, inconvenient and wasteful in that a much larger purchase of pet food may need to be made than is needed and all or some of the purchased items may have to be disposed of at the end of the trip. Alternatively, all or some of these items can be brought along on the trip if it is not impractical or inconvenient to do so and if space is available. The preparation of these items for a trip may also be time consuming and inconvenient. In any event, the pet owner wants to be able to provide an appropriate meal for the pet which the pet is accustomed to eating and in a proper amount without fuss or inconvenience.

Although many containers are commercially available which can be used for holding and dispensing different items of food and/or water such containers as are presently commercially available are designed for consumption of food by a human and not for pets. Moreover, such containers are not properly designed for a pet dog or cat to drink water from and do not provide pet food and water in predefined quantities to facilitate convenient mixing into a predefined pet meal for a canine pet dog or feline pet cat without fuss.

SUMMARY OF THE INVENTION

The travel container of the present invention is a disposable package in the form of a kit which will provide a container for drinking water and for the storage of a predefined quantity of pet food and drinking water which upon mixing form a predefined meal for a pet dog or cat when traveling on a short excursion, said travel container comprising, in combination, an open receptacle having a relatively deep compartment with a flat bottom and a large opening for storing a supply of pet food and/or for use as a reservoir for providing water for the pet to drink from, a cover lid for closing the open receptacle and a separate sealed pouch in which a source of water is stored in the container with the supply of pet food and the source of water present in proportional amounts to form a predefined convenience pet meal upon mixing the water and pet food in the open receptacle. The preferred embodiment incorporates in the travel container a separate member in the form of e.g., an elongated plastic stick to facilitate opening the sealed pouch of food and water as well as for mixing the water and pet food in the container. When the travel kit is used for a feline pet cat an additional foldable litter tray is provided which can also be stored in the travel container readily opened for use and easily disposed of after being used.

BRIEF DESCRIPTION OF THE DRAWINGS

Other features and advantages of the present invention will become apparent from the following detailed description of the preferred embodiment when read in conjunction with the following drawings of which:

FIG. 1 is a perspective view of the travel container of the present invention in the closed position oriented to expose the locking flap;

FIG. 3 is a bottom plan view of the container of FIG. 1;

DESCRIPTION OF PREFERRED EMBODIMENT

Figure 2:
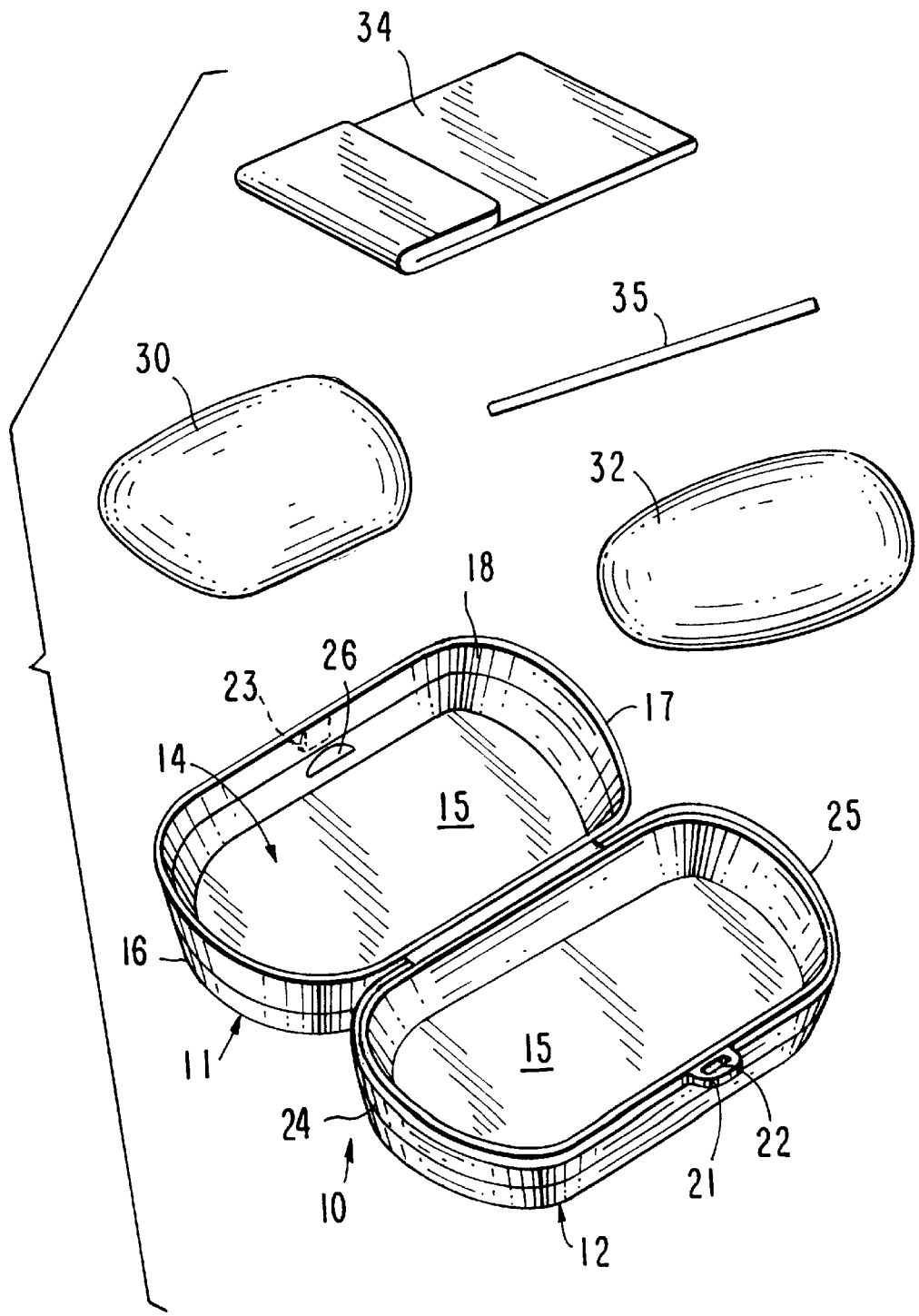
FIG. 2 is an exploded perspective view of the travel container of the present invention shown in the open position along with a supply of a desired pet food and a supply of purified water with each stored in separate pouches as well as a separate mixing element and a folded up scoop bag.

The travel container 10 of the present invention is a disposable package in the form of a kit comprising, as is shown in FIGS. 1–3, a lower half 11 and a symmetrical upper half 12 which are pivotally connected to one another in a clam shell configuration having an open position as shown in FIG. 2 and a closed position as shown in FIG. 1 respectively. The lower half 11 of the container 10 has a deep reservoir 14 forming an open compartment, a flat bottom 15 and side walls 16. The side walls 16 extend upwardly from the flat bottom 15 to a rim 17 surrounding a large opening 18 at the top end of the reservoir 14. When the container 10 is in the open position the deep reservoir 14 defines a relatively large area for mixing pet food and water into a prepared meal for a pet dog or pet cat to eat from. The container 10 may also be separately and independently used as a drinking bowl for the pet dog or pet cat. The flat top or bottom 15 provides stability for the container 10 so that it does not turn over when the pet is drinking or eating food out from the reservoir 14. The side walls 16 flare outwardly from the flat bottom 15 to maximize the size of the opening 18 at the top end of the reservoir 14. The overall shape of the of the container 10 and geometry of the opening 18 are not critical to the present invention although an oval shaped geometry for each half and an elliptical shaped opening 18 is preferred.

The top half 12 of the container 10 has a flap 21 extending therefrom with an opening 22 to engage a ridge 23 on the lower half 11 just below the rim 17 for closing the container 10. The top half 12 of the container 10 may be connected to the bottom half 11 in any manner which will permit the container 10 to open and close easily. It is preferred for the two halves 11 and 12 of the container 10 to substantially have mirror image configurations of one another so that when the halves 11 and 12 are closed a complementary open area is formed in the top half 12 above the opening 18 of the reservoir 14 which will maximize the storage space in the container 10 for the storage of food and water inside the container 10. For simplicity of manufacture the container 10 can be molded in one piece from a plastic composition with each half of the clam shaped body interconnected by a flexible strip of plastic so that each half is pivotally connected to one another. The side walls 24 in the upper half 12 may include a slight flare or inclination at the edge 25 of the upper half 12 which aligns with the rim 17 in the lower half 11 to facilitate closing the container 10. In the closed position the side walls 24 in the upper half 12 may slightly overlap the rim 17 to secure the container 10 in a closed position. The flap 21 locks the upper half 12 to the lower half 11 when the opening 22 is placed over the ridge 23. To facilitate locking of the flap 21 over the ridge 23 a depression 26 is formed in the side wall 16 of the lower half 11 just below the ridge 23 against which the flap 21 rests when closing the container 10.

The travel container 10 is designed to store a desired pet food for a pet dog or cat and a supply of water with each in a predetermined proportion to one another to form a predefined meal for the pet dog or pet cat respectively when mixed together. The pet food is preferably in a dry form, such as in pellets, and stored in a pouch 30 in a predetermined quantity. The dimensional size of the pouch 30 should be slightly less than the dimensions of the opening 18 and should occupy a volume sufficiently less than the combined open areas formed by the clam shell body of the container 10 so that the pouch 30 can be stored inside the container 10 and permit storage of a separate sealed pouch 32 for water, a folded up scoop bag 34 for a canine pet dog and a stick 35. The pet food in the pouch 30 can be dispensed into the reservoir 14 in either half of the container 10 into which water is also dispensed to form the meal. Obviously, additional water can be dispensed into the reservoir 14 in the other half of the container 10 as shown in FIG. 2 to simultaneously provide food and water if desired. When the travel container 10 is used for a pet cat a foldable litter box 40 and an optional pouch 41 containing cat litter 42 may be included instead of the scoop bag. The same container 10 can be used for either a pet dog or a pet cat. A smaller size pouch 30 may be used for a pet cat to provide additional space for storing the foldable litter box 40 and a litter pouch 41. The pouch 41 of cat litter 42 is shown in phantom in FIG. 4 to indicate that it is optional. The size of the travel container 10 is not critical to the invention and may obviously vary in size and/or proportion to accommodate different size dogs and cats.

Each pouch 30, 32 and 41 may be formed from any relatively thin plastic material composition or from cellophane so that it can be easily punctured using the stick 35 to open it. Alternatively, each pouch can have a conventional tear strip at one corner so that it can be readily opened without using the stick 35. The material composition selected for each pouch should preferably be transparent. The pouch of water 32 should preferably be purified water and in a predefined amount such that upon adding water from the pouch 32 to the portion of pet food from the pouch 30 a predefined meal for the pet is formed. The stick 35 may also be used to mix the water and pet food if desired.

Figure 4:
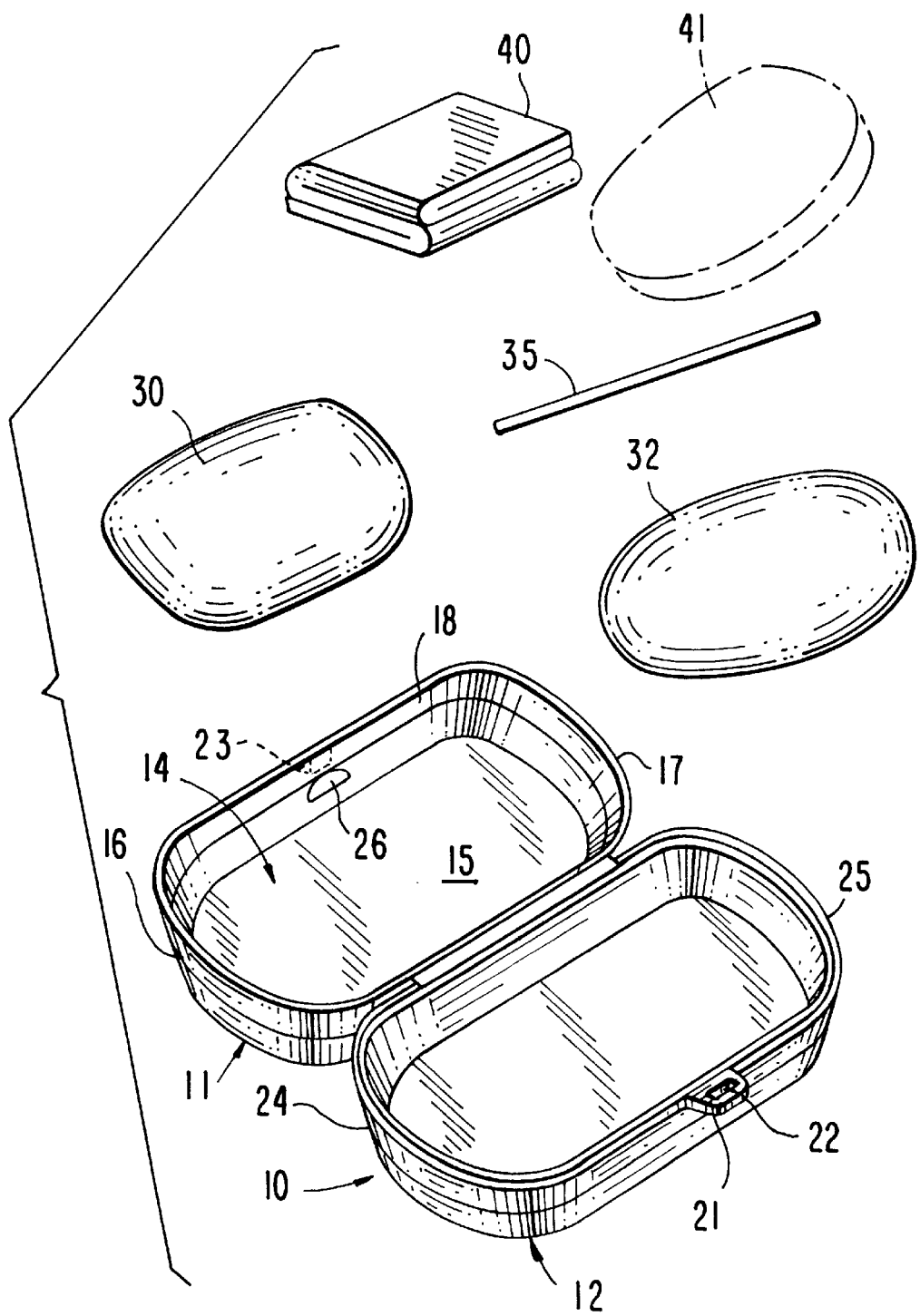
FIG. 4 is an exploded perspective view of the travel container shown in the open position similar to that shown in FIG. 2 specifically for use by a feline pet cat along with a supply of desired pet food and a supply of purified water with each stored in a separate pouch, a mixing element a foldable litter box shown in the folded position and an optional supply of cat litter in a separate pouch.
Figure 5:
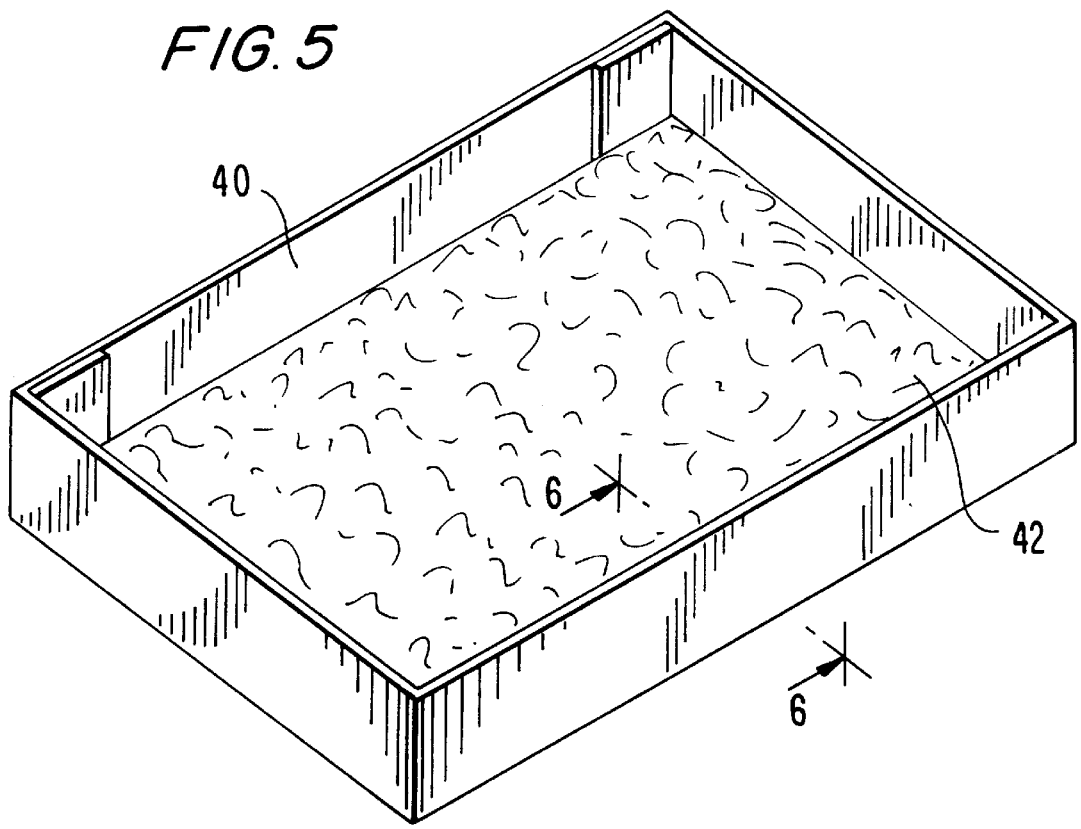
FIG. 5 is a perspective view of the cat litter box of FIG. 4 in the unfolded position with cat litter placed therein and FIG. 6 is a partial cross sectional view taken along the lines 6—6 of FIG. 5.
Figure 6:
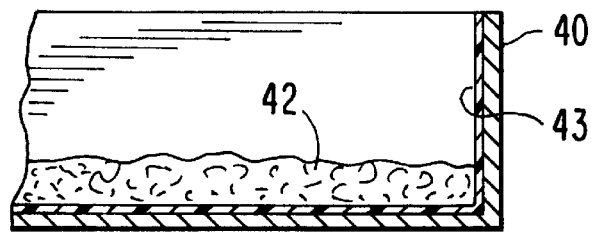

When the travel container 10 is used for a canine pet dog a folded up scoop bag 34 is provided and stored in the container 10. The scoop bag 34 may be composed of a thin plastic material such as a conventional thermoplastic or thermosetting polymer composition and may be of a single size or of at least two different sizes based on the size of the canine pet dog. For a feline pet cat a foldable liter tray 40 is provided which is shown in FIG. 4 in the folded up position and in FIG. 5 in the unfolded position. The liter tray 40 must be foldable so that it can be stored in a folded up position in the travel container 10 and easily disposed of after use. It must also be of a sturdy composition so that when opened into the unfolded position as shown in FIG. 5 it will remain in that position and be relatively sturdy so as to support the litter 42 and be usable by the feline pet cat as a litter box. To provide this function it is also necessary for the liter tray 40 to be nonabsorbent. The preferred material of construction for the litter tray 40 is cardboard which is a composition of moderately thick laminations of paper made from cellulose or vegetable fibers. Cardboard is preferred because it is inexpensive, can be readily shaped into a desired configuration such as a rectangular box having a bottom wall surface and four upright side wall surfaces which can be folded up to take up little space in the folded position such that, if desired, it can be stored in the container 10 before use. When folded open it is sufficiently sturdy that it will retain its shape and support litter 42. The litter tray 40 should have a thin coating of wax on the inside surface 43 to render it substantially nonabsorbent and impervious to water. The wax coating 43 can be of any conventional wax composition which will render the litter box 40 nonabsorbent and will permit the litter tray 40 to be disposed of in a public garbage disposal. Alternatively, the litter box 40 may be formed from a conventional plastic nonabsorbent material having the shape of an open box but which is foldable for storage in the container 10 before use.

What is claimed is:

1. A disposable mobile travel container of food and water for a pet canine in the form of a kit comprising, in combination, an open receptacle having a flat bottom and a relatively deep compartment forming an open reservoir with a large opening, a cover for closing the open receptacle, a movable flap extending from said cover over the open receptacle to engage a ridge on the open receptacle for securing the cover to the open receptacle, said open receptacle including a depression located directly below said ridge to facilitate placement and removal of the flap into and out of the ridge, a first closed pouch stored in the open receptacle composed of a flexible material and containing a predefined quantity of sterile water, a second closed pouch stored in the open receptacle composed of a flexible material and containing a predefined quantity of dry pet canine food in a preserved state with the amount of food and water in each of said closed pouches being in a predetermined proportion to one other to form a predefined single meal of fresh food and sterile water for a pet canine upon opening the closed pouches and with the container further comprising a folded up scoop bag for the pet canine with the container adapted to be disposed of after said single use.

2. A mobile travel container for a pet canine as defined in claim 1 wherein said closed first pouch and said closed second pouch are each of a material selected from the group consisting of plastic or cellophane.

3. A mobile travel container for a pet canine as defined in claim 2 further comprising a thin elongated element stored in said container to facilitate opening each pouch.

4. A mobile travel container for a pet as defined in claim 2 wherein said container has two substantially symmetrical halves arranged in a clam shell configuration which are interconnected to form a lower half and an upper half respectively.

5. A mobile travel container for a pet as defined in claim 4 with each half having a flat bottom and a deep compartment for forming an open reservoir with a large opening such that when the lower and upper half are placed together a large storage area is formed for storing said pouch of water and said pouch of pet food internal of said container.

6. A mobile travel container for a pet canine as defined in claim 5 wherein said flap has an opening to engage and disengage said ridge.

7. A disposable mobile travel container for a pet cat in the form of a kit comprising, in combination, an open receptacle having a flat bottom and a relatively deep compartment forming an open reservoir with a large opening, a cover for closing the open receptacle with the cover further comprising a flap extending over the open receptacle to engage a ridge on the open receptacle for securing the cover to the open receptacle for storing a first and second independently closed pouch internal of the receptacle, with the first closed pouch forming a sealed enclosure containing a predefined quantity of water in a sterile environment and with said closed second pouch containing a predefined quantity of dry pet food in a preserved environment and with the food and water in each of said closed pouches being stored separately and in a predetermined proportion to one other to form a predefined pet meal which remains preserved until the closed pouch and sealed enclosure is opened and further comprising a flap extending from the upper half for engaging a ridge extending from the lower half to lock the two halves together and a pouch of litter for storage in said container.

8. A mobile travel container for a pet as defined in claim 7 wherein said fordable litter tray is constructed of cardboard having a coating of wax on at least the interior surface thereof when in the open position.

\* \* \* \* \*